United States Patent [19]

Rasmussen

[11] 4,389,710
[45] Jun. 21, 1983

[54] BRAKING SYSTEM TEST CIRCUIT

[75] Inventor: John P. Rasmussen, Clinton, Ohio

[73] Assignee: Goodyear Aerospace Corporation, Akron, Ohio

[21] Appl. No.: 224,418

[22] Filed: Jan. 12, 1981

[51] Int. Cl.³ .................... G06F 11/32; G01R 15/12
[52] U.S. Cl. .................... 364/551; 303/92; 364/580; 371/20; 371/25
[58] Field of Search .................... 364/426, 551, 580; 371/15, 20, 23, 25, 29; 303/92; 324/73 R

[56] References Cited

U.S. PATENT DOCUMENTS

| | | | |
|---|---|---|---|
| 3,764,995 | 10/1973 | Helf, Jr. et al. | 324/73 R X |
| 3,832,535 | 8/1974 | De Vito | 371/25 X |
| 3,849,726 | 11/1974 | Justice | 324/73 R |
| 4,044,244 | 8/1977 | Foreman et al. | 371/20 |
| 4,055,801 | 10/1977 | Pike et al. | 371/25 X |
| 4,192,180 | 3/1980 | Gerstenmeier et al. | 303/92 X |
| 4,270,809 | 6/1981 | Ohmori et al. | 303/92 |

Primary Examiner—Jerry Smith
Attorney, Agent, or Firm—P. E. Milliken; R. L. Weber; L. A. Germain

[57] ABSTRACT

Test circuitry for exercising and testing the operability of antiskid and automatic braking control circuits in an aircraft braking system. The invention includes a digital processor communicating with an interface circuit associated with each antiskid control circuit and the automatic braking system valve drivers. Each such interface circuit includes an analog switch receiving an electrical stimulus from the processor and applying the same to various test points in the associated antiskid control circuit or automatic braking system valve drivers. An analog selector is connected to various test points in the antiskid control circuits and automatic braking system valve drivers to sense the responses to the electrical stimulus and to pass such responses to the processor to determine the operability of the antiskid and automatic braking control systems.

5 Claims, 3 Drawing Figures

BRAKING SYSTEM TEST CIRCUIT

TECHNICAL FIELD

The invention herein resides in the art of braking systems of the type incorporating antiskid or automatic braking control circuitry. More particularly, the invention relates to test circuitry for exercising and testing the operability of the antiskid and automatic braking control circuits prior to the time that such circuits are called upon for regulating the braking effort of the associated vehicle.

BACKGROUND ART

Many of the braking systems known today include antiskid control circuitry to achieve a modulation of the brake pressure when incipient or deep skids are detected in the braking operation. Similarly, automatic braking systems have been known by which a preselected rate of deceleration is achieved and maintained throughout the braking effort. Both antiskid and automatic braking control circuitry are now commonly used in the aircraft industry to minimize stopping distances while assuring passenger comfort and safety.

Known systems have typically been of an analog nature, constructed of discrete components, and limited as to operational speed, packaging density, and functional flexibility. Further, while some rudimentary approaches have been taken to achieve a testing of the braking system prior to its required operation, such approaches have been incapable of fully exercising the system. Finally, there are no known means for fault location and isolation in a braking system, nor are there systems known which include means for storing data respecting the testing results.

DISCLOSURE OF INVENTION

In light of the foregoing, it is an object of a first aspect of the invention to provide a braking system test circuit of a digital nature, having the flexibility to accommodate numerous and varied tests on antiskid and automatic braking control systems.

It is an object of yet another aspect of the invention to provide a braking system test circuit which may be directly interconnected with antiskid and automatic braking control systems at various points in such systems to exercise the same and monitor the responses therefrom.

It is yet a further object of another aspect of the invention to provide a braking system test circuit capable of determining if an antiskid or automatic braking control system has failed and where such failure occurred in such system.

It is yet another object of an additional aspect of the invention to provide a braking system test circuit which includes means for storing test results such that even intermittent failures, or those occurring only once, can be recorded.

Another object of still a further aspect of the invention is to provide a braking system test circuit embodying concepts which may be readily adapted for implementation with any of numerous aircraft braking systems.

The foregoing and other objects of aspects of the invention which will become apparent as the detailed description proceeds are achieved by the improvement in a braking system for aircraft having antiskid control circuits associated with the brakes of the wheels thereof, the improvement, comprising: a digital processor; and interface circuit means interconnected between said processor and the antiskid control circuits for exercising selected circuit functions of the antiskid control circuits under direction of said processor, sensing responses to said selected functions, and providing such responses to said processor for evaluation of the operability of the antiskid control circuits.

DESCRIPTION OF DRAWINGS

For a complete understanding of the objects, techniques, and structure of the invention, reference should be had to the following detailed description and accompanying drawings wherein.

BEST MODE FOR CARRYING OUT THE INVENTION

Figure 1:
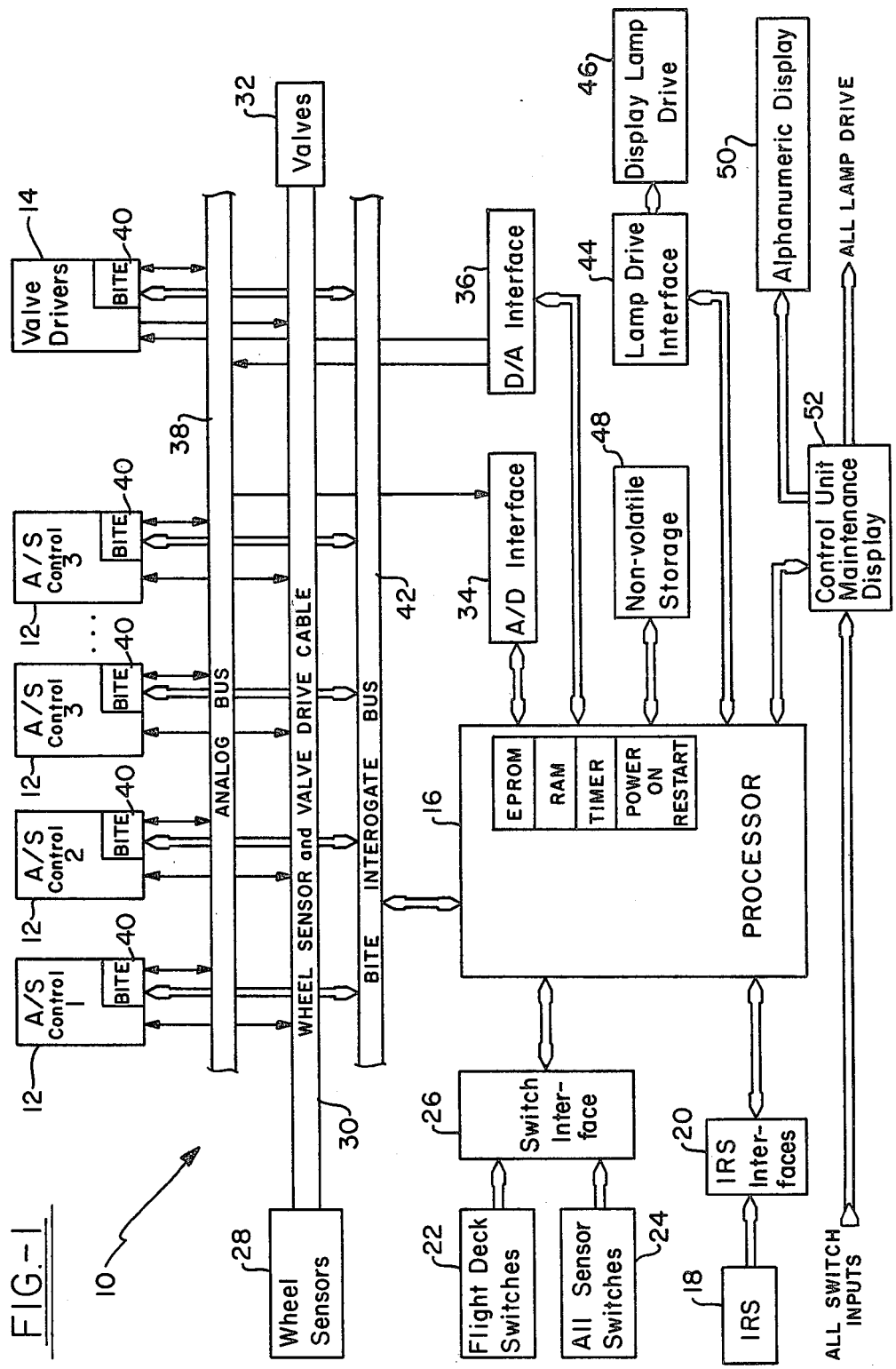
FIG. 1 is a block diagram schematic of the braking system test circuit of the invention.

Referring now to the drawings and more particularly, FIG. 1, it can be seen that a braking system embodying the teachings of the invention is designated generally by the numeral 10. The system shown is that for an aircraft having either eight wheels or eight pairs of wheels with an antiskid control system being provided for each such wheel or pair. It will be appreciated that while the preferred embodiment is described with respect to an aircraft braking system, the concepts hereof are applicable to other braked vehicles.

Antiskid control circuits 12 are provided, one for each wheel or pair of wheels, in typical fashion. The antiskid control circuits may be of any suitable specific nature, while performing the art-recognized function of modulating brake pressure upon the sensing of a skid. A valve driver board 14 for the automatic braking system is also provided, it being understood that the concept of the invention is equally applicable to systems having either antiskid control, automatic braking, or both. The valve driver board 14 is provided to regulate the automatic braking valves in accordance with control signals generated by the digital processor 16. While the specific nature of the automatic braking system is not necessary for an appreciation of this invention, suffice it to say that the processor 16 may provide control signals to the automatic braking system valve drivers 14 to allow the aircraft to seek and obtain a preselected deceleration rate.

The processor 16 may be of any suitable nature. Such a processor includes a microprocessor as for example the Intel 8085 model, EPROM memory for receiving and storing a control program, a RAM memory to function as a "scratch pad" memory, and may also include a timer for execution of real-time functions. Of course, a power on-restart detection circuit and switch for initializing the microprocessor prior to the entry into the program routine is also included.

An input to the processor 16 is from the inertial reference system (IRS) 18 provided from an on-board computer. Such a computer would be standard on the aircraft and would serially provide digital signals through the IRS interface 20 to the processor 16 corresponding to air and ground acceleration or deceleration, wheel speeds, altitude, attitude, yaw, pitch, and the like. Each such signal would be preceded by an identification code indicating the particular data to follow. Certain of these signals may be obtained by the processor 16 such as the acceleration or deceleration signals to be used for the automatic braking system operation. Indeed, with the microprocessor 16 receiving signals relating to aircraft deceleration and with a comparison signal supplied by the pilot for the desired rate of deceleration, the processor 16 can easily provide a control signal to the automatic braking system valve drivers 14 to effectuate the desired automatic braking. The interface 20 seizes the data following the identification codes of interest, stores the pertinent data in registers, indicates to the processor 16 that the data is available, and ultimately allows the processor to read that data which may then be used by the processor to adjust the control signal to effectuate the desired change in the automatic braking system valve drivers 14.

Also providing inputs to the microprocessor 16 are the flight deck switches 22. These are pilot-controlled switches, typical in an aircraft, which may include the automatic braking system deceleration rate selection switch and other test buttons. Further, the sensor switches 24 provide an input to the processor 16, such sensor switches including, by way of example, the strut squat switch, throttle switches, various on-off switches, the gear down and lock switch, the parking brake switch, and the like. Data corresponding to the state of actuation of the switches 22,24 is scaled and buffered by means of the switch interface 26 before application to the processor 16. It will be appreciated that it is necessary for the processor 16 to know the state of such switches, since the processor-controlled functions can only be performed when certain aircraft operational conditions exist. For example, exercising and testing of the antiskid or automatic braking control systems 12,14 cannot be performed after the squat switch has been actuated, indicating that the aircraft has touched down. At such point in time, actual operation of the systems is required.

Also included in typical fashion are wheel sensors 28, one being typically provided with each wheel or pair of wheels. The wheel sensors 28 include wheel speed transducers, providing a pulsating output signal of a frequency corresponding to the rotational speed of the corresponding wheel. These signals are passed to the associated antiskid control circuit 12 by means of the wheel sensor and valve driver cable 30. As shown, there is an interconnection between the antiskid control circuits 12 and the cable 30 by which wheel speed signals are provided to circuits 12 from the sensors 28 and corresponding antiskid valve control signals are passed from the circuit 12 to the corresponding valve 32. In the case of the automatic braking system valve drivers 14, communication with the valves 32 by the cable 30 is generated by the processor 16 as a function of the IRS data received. It will, of course, be understood that the valves 32 include both antiskid valves and automatic braking valves, each being independently controlled.

Intercommunicating between the units 12,14 and the processor 16 via the analog bus 38 are analog to digital and digital to analog interfaces 34,36, respectively. The analog to digital interface 34 receives analog data or responses from the antiskid control circuits 12 and the valve drivers 14, converts the same to a digital format, and supplies it to the processor 16. Similarly, the processor 16 emits digital data to the digital to analog interface 36, which, in turn, converts the same to a corresponding analog signal for application to either the antiskid control circuits 12 or the automatic braking valve drivers 14. As will be discussed in detail hereinafter, the processor 16, via the digital to analog interface 36, excites a particular portion of selected ones of the units 12,14 and then looks for an appropriate response to such excitation as provided through the analog to digital interface 34.

As illustrated in FIG. 1, the communication just described via the analog bus 38 is with built-in test equipment (BITE) circuitry 40, uniquely associated with each of the circuit boards 12,14. Access to selected BITEs 40, in a manner to be discussed hereinafter, is achieved via the BITE interrogate bus 42. As shown, bi-directional communication between the BITEs 40 and the processor 16 is achieved via this bus 42.

Finally, and of brief interest to the invention herein, there is also provided in the circuitry of the invention, a lamp drive interface 44, interconnected with a display lamp drive circuit 46, which communicates with the processor 16 to indicate, via the illumination of particular lamps, various operational conditions, responses, identities of failing wheels, and the like. There is also provided a nonvolatile storage 48 in communication with the processor 16, such storage receiving from the processor 16 data corresponding to test results from exercising of the antiskid circuits 12 and automatic brake control valves 14. The storage 48 is preferably established on the basis that the existence of the failure of any test be stored. Accordingly, even if the failure was an intermittent one, the fact that such a failure occurred is made of record such that when the storage 48 is read, the existence of such failure may be noted and appropriate remedies taken. As will be discussed hereinafter, various points of interest in the circuits 12,14 will be monitored on each test run with a failure at any such point being uniquely stored at a particular position in the storage 48. Accordingly, the storage 48 provides a permanent record for fault location and isolation, allowing the operator not only to determine which circuit 12,14 has failed, but also to monitor what point in that circuit failed.

There is also provided with the circuitry 10 an alphanumeric display 50 and a control unit and maintenance display unit 52. The alphanumeric display displays the operation selected by pilot-operatable switch inputs which the processor 16 is performing. In other words, the display 50 indicates the particular test selected by the pilot for exercising of the circuits 12,14. The circuit 52 provides the interface for the system switch inputs, for example, the test switches which may be selected by the pilot, and further drives whatever lamps might be required for association with the control unit apart from the alphanumeric display 50.

Figure 2:
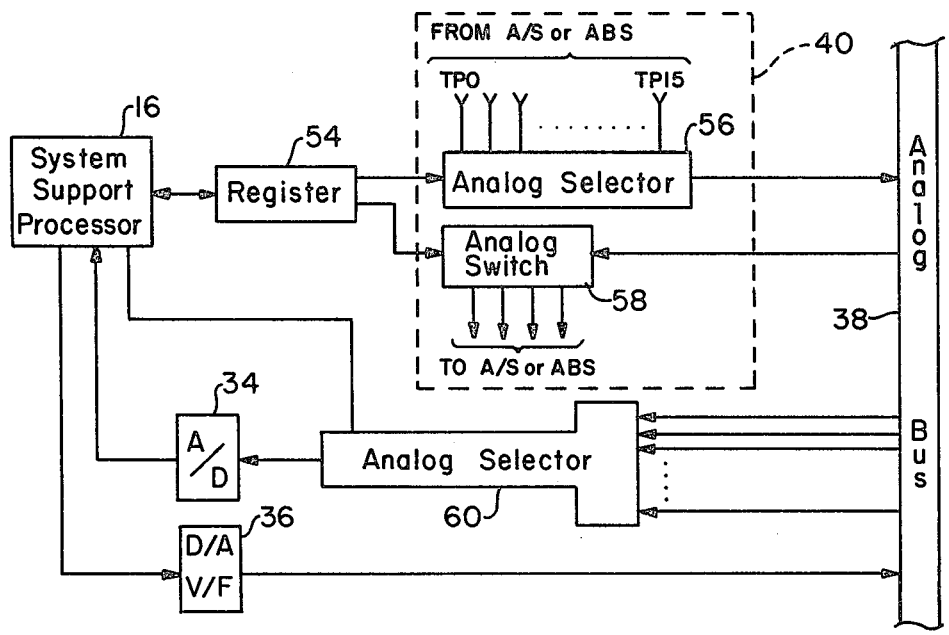
FIG. 2 is a circuit schematic of the interface circuitry interconnecting the processor with the associated brake control system.

With reference now to FIG. 2, a detailed illustration of the BITE circuit 40 and its interconnection with the processor 16 may be seen. As illustrated, the processor 16 communicates through a register 54 to access either an analog selector 56 or an analog switch 58 on each of the BITEs 40. The selector 56 has 16 inputs, each connected to a unique test point in the associated circuit 12,14. By appropriately addressing the selector 56, one of those sixteen test point inputs may be connected to the single output of the selector 56. That output is then passed via the analog bus 38 through an analog selector 60, the analog to digital converter 34, and back to the processor 16. Thus, the processor 16 can receive a digital signal corresponding to the analog response at a particular test point in each of the circuits 12,14. The particular circuit 12,14 which is to be monitored is selected by means of the analog selector 60, addressed by the processor 16. Accordingly, by appropriately addressing the analog selectors 56,60, a particular point in a particular one of the circuits 12,14 may be monitored with the analog response being converted to a digital signal which can be quickly processed by the processor 16.

In similar fashion, the processor 16 provides a digital signal, converted either to an analog signal or to a frequency by the digital to analog converter 36, which may be applied to one of various selected points in the circuits 12,14. As shown, the analog switch 58 is operative under control of the processor 16 via the register 54 to direct the application of such analog or frequency signal to one of four points in the associated circuit 12,14.

In typical operation, the processor 16 will, through the converter or interface 36, excite a point in each of the circuits 12,14, that point being selected by the register 54 and switch 58. Certain of the test points connected to the selector 56 will then respond with a signal, dependent upon which point in the circuit has been excited. An appropriate test point will be selected by means of the register 54 and the BITE 40 of interest will be selected by the selector 60. The corresponding analog response signal will then be converted to a digital signal via the analog to digital interface 34 and thence applied to the processor 16. If the response is indicative of a failure, a lamp indicating such failure may be illuminated. In any case, an indication of that failure will be stored in the storage 48 for later use or for immediately advising the pilot of the failure. By appropriately programming the processor 16, all pertinent points in the circuits 12,14 may be exercised, and all corresponding response points in those circuits may be monitored.

Figure 3:
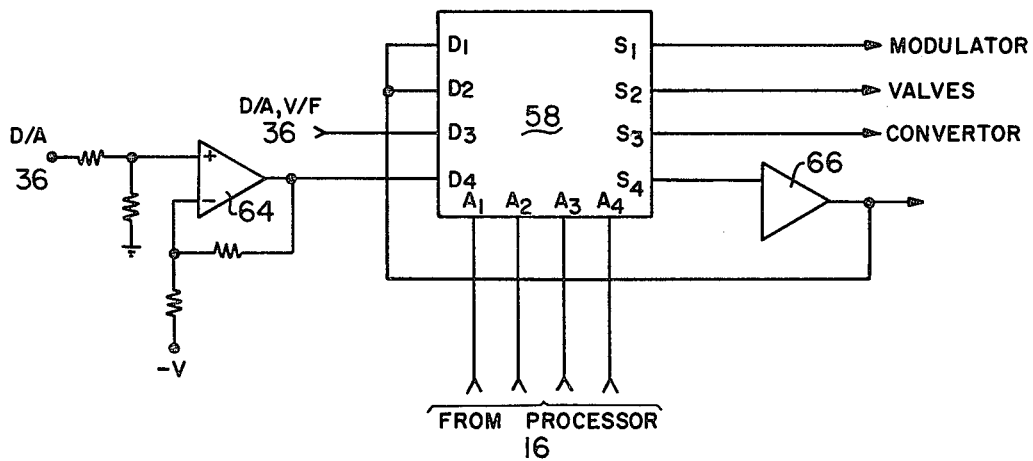
FIG. 3 is a circuit schematic of the test signal generator and switching circuit of the invention.

In a preferred embodiment of the invention, the test points are interconnected to the analog selector 56 to provide signals corresponding to the following: wheel speed, wheel speed deceleration, modulator operation, converter output, frequency compensation circuit operation, skid detector operation, converter filter operation, current to the valves, the drop across the valve coils, the reserve DC voltage supply, current to the reserve valve coil, converter sensor operation, the main DC voltage supply, and the modulator ramp or capacitor voltage. It will be readily appreciated by those skilled in the art that the failure of any of these signals will readily isolate a malfunction in the corresponding circuit 12,14. With final reference to FIG. 3, it can be seen that the analog switch 58 is connected with address lines from the processor 16 and with a stimulus to the modulator, valves, and converter circuits. A frequency stimulus is provided to the input D3 to excite the converter since the converter is frequency responsive. Analog signals are provided through the operational amplifier 64 to excite the amplifier 66 to provide corresponding analog signals to both the modulator and the valves, as illustrated. For example, these analog signals could be indicative of an incipient or a major skid.

It will be appreciated by those skilled in the art that the system presented hereinabove can be altered, modified, or programmed to obtain any of numerous test functions. Those skilled in the art, with the benefit of the teachings herein, may readily devise microprocessor programs capable of implementing various excitation signals and response criteria to determine the operability of antiskid or automatic braking control systems.

While in accordance with the patent statutes only the best mode and preferred embodiment of the invention has been presented and described in detail, it is to be understood that the invention is not limited thereto or thereby. Accordingly, for an appreciation of the true scope and breadth of the invention, reference should be had to the following claims.

I claim:

1. In a braking system for an aircraft having antiskid control circuits associated with the brakes of the wheels thereof, the improvement, comprising:
   a digital processor;
   interface circuit means interconnected between said processor and the antiskid control circuits for exercising selected circuit functions of the antiskid control circuits under direction of said processor, sensing responses to said selected functions, and providing such responses to said processor for evaluation of the operability of the antiskid control circuits; and
   wherein said interface circuit means exercises said selected circuit functions by the application of stimuli which simulate actual responses in the antiskid control circuits resulting from the braking of the aircraft on a runway and wherein said interface circuit means comprises:
   first gating means for receiving excitation signals from said processor and applying such signals as inputs to selected test points on the associated antiskid control circuit;
   second gating means for receiving response signals from additional selected test points on the associated antiskid control circuit, said response signals resulting from said excitation signals, said second gating means passing said response signals to said processor;
   said first gating means comprising an analog switch connected to and addressed by said processor and converter circuit means interconnected between said processor and analog switch for converting digital excitation signals from said processor to states usable by the antiskid control circuits, said converter circuit means comprising both digital to analog and voltage to frequency converters; and
   said second gating means comprising an analog selector connected to and addressed by said processor, and an analog to digital converter interposed between said analog selector and processor for converting said response signals form an analog to digital form.

2. The improvement in a braking system according to claim 1 wherein said interface circuit means is interconnected with a plurality of test points of each antiskid control circuit.

3. The improvement in a braking system according to claim 2 wherein said interface circuit means comprises a plurality of identical circuits, one interconnected between said processor and each of the antiskid control circuits.

4. The improvement in a braking system according to claim 1 which further includes a selector interconnected between each of said analog selectors of each of said identical circuits and said processor, said selector being addressed by said processor for passing said response signals from selected antiskid control circuits to said processor, said processor receiving and storing data corresponding to said response signals when said response signals are indicative of either continuing or intermittent faults within the antiskid control circuits.

5. In an aircraft braking system, including a plurality of antiskid control circuits, an exerciser, comprising:
   a digital processor;
   a first switch means uniquely interconnected between said processor and each of said antiskid control circuits for exciting various points of the associated antiskid control circuits with an electrical stimulus which simulates an actual response in the antiskid control circuit of an operative condition;
   a second switch means uniquely interconnected between said processor and each of the antiskid control circuits for receiving response signals from selected points of the associated antiskid control circuits resulting from said stimulus and passing said response signals to said processor, said processor storing data obtained from said response signals when such data is indicative of either continuing or intermittent faults in the operation of the antiskid control circuits;
   a third switch means interconnected between said processor and each of said second switch means for exclusively passing said response signals from selected ones of said antiskid control circuits to said processor;
   an analog to digital converter interconnected between said third switch means and said processor;
   a digitial to analog and a voltage to frequency converter interconnected between said first switch means and said processor, said converters providing said electrical stimulus; and
   wherein said first switch means is interconnected with a valve driver, modulator, and a converter in each said antiskid control circuit.

* * * * *